(12) United States Patent
Chen et al.

(10) Patent No.: US 12,105,525 B2
(45) Date of Patent: Oct. 1, 2024

(54) CARAVANNING AUTONOMOUS VEHICLES

(71) Applicant: THE TRUSTEES OF INDIANA UNIVERSITY, Indianapolis, IN (US)

(72) Inventors: Yaobin Chen, Carmel, IN (US); Euzeli C. Dos Santos, Indianapolis, IN (US); Clayton Lowell Nicholas, Indianapolis, IN (US)

(73) Assignee: THE TRUSTEES OF INDIANA UNIVERSITY, Indianapolis, IN (US)

(*) Notice: Subject to any disclaimer, the term of this patent is extended or adjusted under 35 U.S.C. 154(b) by 705 days.

(21) Appl. No.: 17/273,518

(22) PCT Filed: Sep. 6, 2019

(86) PCT No.: PCT/US2019/050012
§ 371 (c)(1),
(2) Date: Mar. 4, 2021

(87) PCT Pub. No.: WO2020/051492
PCT Pub. Date: Mar. 12, 2020

(65) Prior Publication Data
US 2021/0200243 A1    Jul. 1, 2021

Related U.S. Application Data

(60) Provisional application No. 62/727,729, filed on Sep. 6, 2018.

(51) Int. Cl.
| | |
|---|---|
| *G05D 1/00* | (2024.01) |
| *B60L 53/12* | (2019.01) |
| *H02J 50/05* | (2016.01) |
| *B60D 1/01* | (2006.01) |
| *B60L 50/60* | (2019.01) |

(52) U.S. Cl.
CPC ............ *G05D 1/0295* (2013.01); *B60L 53/12* (2019.02); *G05D 1/0212* (2013.01); *H02J 50/05* (2016.02); *B60D 1/01* (2013.01); *B60L 50/60* (2019.02)

(58) Field of Classification Search
None
See application file for complete search history.

(56) References Cited

U.S. PATENT DOCUMENTS

| | | | | |
|---|---|---|---|---|
| 9,940,840 | B1* | 4/2018 | Schubert | G01C 21/3407 |
| 10,108,202 | B1* | 10/2018 | Aikin | G08G 1/22 |
| 11,878,595 | B2* | 1/2024 | Masoud | H02J 50/05 |
| 2010/0256852 | A1 | 10/2010 | Mudalige | |

(Continued)

FOREIGN PATENT DOCUMENTS

IN    201641044061    6/2018

OTHER PUBLICATIONS

Search Report & Written Opinion issued in PCT/US2019/050012 (Feb. 25, 2020).

*Primary Examiner* — Jelani A Smith
*Assistant Examiner* — Davin Seol
(74) *Attorney, Agent, or Firm* — Barnes & Thornburg LLP (57) ABSTRACT

A caravanning vehicle system includes a lead vehicle having an engine and at least one trailing vehicle having an electric motor. The at least one trailing vehicle is non-mechanically connected to the lead vehicle. The lead vehicle includes a power transfer system that is configured to transfer electric power, wirelessly, to the at least one trailing vehicle.

20 Claims, 5 Drawing Sheets

(56) References Cited

U.S. PATENT DOCUMENTS

| | | | |
|---|---|---|---|
| 2010/0275858 A1* | 11/2010 | Jeffs | F02B 43/10 |
| | | | 123/3 |
| 2013/0043838 A1* | 2/2013 | Tsuchiya | H02J 5/00 |
| | | | 320/109 |
| 2014/0347008 A1* | 11/2014 | Chae | H02J 50/80 |
| | | | 320/108 |
| 2016/0129793 A1* | 5/2016 | Cronie | H02J 50/90 |
| | | | 320/109 |
| 2016/0329752 A1* | 11/2016 | Bae | H02J 7/00034 |
| 2017/0308097 A1 | 10/2017 | Switkes et al. | |
| 2019/0222073 A1* | 7/2019 | Lee | H02J 50/12 |
| 2021/0194296 A1* | 6/2021 | Jo | H02J 50/80 |

* cited by examiner

CARAVANNING AUTONOMOUS VEHICLES

CROSS REFERENCE TO RELATED APPLICATION

This application is a U.S. nationalization under 35 U.S.C. § 371 of International Application No. PCT/US2019/050012, filed 6 Sep. 2019, which claims priority to Provisional Patent Application No. 62/727,729, filed Sep. 6, 2018. The disclosures set forth in the referenced applications are incorporated herein by reference in their entireties.

TECHNICAL FIELD

The invention relates to transportation technology for supply chains. More particularly, embodiments of the invention relate to an autonomous caravanning vehicle system.

BACKGROUND

In ground transportation, effective supply chain management demands that available resources including vehicles and drivers must be effectively managed. Conventional ground transportation utilizes tractor-trailer combinations in which a tractor module is pivotally and mechanically attached to a separate trailer. Challenges associated with conventional ground transportation include inefficient trip planning, human driver error and downtime, limited shortest path problems, and the like. A need remains for improved systems and methods that avoid the drawbacks of conventional ground transportation.

SUMMARY

Embodiments of the subject matter disclosed herein include an autonomous, caravanning vehicle system. The autonomous, caravanning vehicle system includes a lead vehicle having an engine and at least one parasitic trailing vehicle, where the trailing vehicle is removably and non-mechanically attached to the lead vehicle. Additional trailing vehicles may be configured to be removably and non-mechanically attached to one another in series and/or removably and non-mechanically attached to the lead vehicle. The lead vehicle further includes an electric generator, an electric power converter, and a battery. The lead vehicle further may include an inductive power transfer system that may be used to provide power to trailing vehicles. The lead vehicle may further include an automated driving system.

In the lead vehicle, the electric generator is coupled to the engine, the electric power converter is coupled to the electric generator, and a battery and an inductive power transfer system are connected to the electric power converter. The electric power converter connected to the battery is configured to convert the electric power generated by the generator to the storage battery. In addition, the electric power converter is connected to a power transfer system for wireless power transfer to and from a power transfer system in the trailing vehicle. The lead vehicle may further include a power generation control system to generate sufficient power to charge the battery in the lead vehicle and to charge the battery bank in the one or more trailing vehicles efficiently in a manner to make up for the consumption of stored electric energy by the battery and battery banks depending on the remaining amount of electric energy stored in the battery and battery banks and in various running conditions of the lead vehicle and one or more trailing vehicle modules utilized in the system. In embodiments, the lead vehicle also includes a spacing device that is configured to engage a spacing device on an adjacent trailing vehicle. In other embodiments, the lead vehicle utilizes a magnetic inductor coil to non-mechanically connect to a trailing vehicle.

In embodiments, the trailing vehicle has an electric motor. In addition, the one or more trailing vehicles each may include a power management unit, battery bank, and an electric power converter. The power management unit is coupled to the electric power converter and to the battery bank. The electric power converter is also connected to the power transfer system for wireless power transfer to and from the power transfer system in the lead vehicle and other trailing vehicles, if present. In embodiments, the trailing vehicle further includes a power control system. The trailing vehicle is configured to be removably and non-mechanically attached to the lead vehicle and is configured to be removably and non-mechanically attached to other trailing vehicles. In embodiments, the trailing vehicle utilizes a magnetic inductor coil to non-mechanically connect to the lead vehicle or to other trailing vehicles. In embodiments, the trailing vehicle also includes a spacing device on one or both ends that is configured to engage a spacing device on a lead vehicle and/or to engage a spacing device on an adjacent trailing vehicle.

In an Example 1, a caravanning vehicle system includes a lead vehicle having an engine; and at least one trailing vehicle having an electric motor, wherein the at least one trailing vehicle is non-mechanically connected to the lead vehicle.

In an Example 2, the caravanning vehicle system of Example 1, wherein the lead vehicle and/or the at least one trailing vehicle is autonomous.

In an Example 3, the caravanning vehicle system of Example 2, wherein the at least one trailing vehicle is autonomous, and wherein the at least one trailing vehicle is configured to non-mechanically connect to the lead vehicle by autonomously following the lead vehicle and staying within a predefined distance of the lead vehicle.

In an Example 4, the caravanning vehicle system of any of Examples 1-3, wherein the engine comprises at least one of an internal combustion engine and a hydrogen fuel cell engine.

In an Example 5, the caravanning vehicle system of Example 4, wherein the lead vehicle further comprises an electric generator that is driven by the engine to generate electric power.

In an Example 6, the caravanning vehicle system of Example 5, wherein the lead vehicle further comprises a power transfer system configured to transfer the electric power generated by the electric generator to the at least one trailing vehicle.

In an Example 7, the caravanning vehicle system of Example 6, wherein the power transfer system comprises an inductive power transfer system.

In an Example 8, the caravanning vehicle system of any of Examples 1-7, the at least one trailing vehicle comprising a first trailing vehicle and a second trailing vehicle.

In an Example 9, the caravanning vehicle system of Example 8, wherein the first trailing vehicle is programmed to travel to a first destination along a first route and the second trailing vehicle is programmed to travel to a second destination along a second route, wherein the first and second routes include a shared route portion.

In an Example 10, the caravanning vehicle system of Example 9, wherein the first and second trailing vehicles are programmed to caravan with the lead vehicle during the shared route portion.

In an Example 11, a method of operating a caravanning vehicle system includes non-mechanically connecting a first trailing vehicle to a lead vehicle, the lead vehicle having an engine; non-mechanically connecting a second trailing vehicle to the first trailing vehicle; programming the first trailing vehicle to travel to a first destination along a first route; and programming the second trailing vehicle to travel to a second destination along a second route, wherein the first and second routes include a shared route portion during which the first and second trailing vehicles are programmed to caravan with the lead vehicle.

In an Example 12, the method of Example 11, wherein the first and second trailing vehicles are autonomous.

In an Example 13, the method of either of Examples 11 or 12, wherein the lead vehicle comprises an electric generator that is driven by the engine to generate electric power.

In an Example 14, the method of Example 13, wherein the lead vehicle further comprises a power transfer system configured to transfer the electric power generated by the electric generator to the at least one trailing vehicle.

In an Example 15, the method of Example 14, wherein the power transfer system comprises an inductive power transfer system.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

While the disclosed subject matter is amenable to various modifications and alternative forms, specific embodiments have been shown by way of example in the drawings and are described in detail below. The intention, however, is not to limit the subject matter disclosed herein to the particular embodiments described. On the contrary, the disclosure is intended to cover all modifications, equivalents, and alternatives falling within the scope of the subject matter disclosed herein, and as defined by the appended claims.

DETAILED DESCRIPTION

Figure 1:
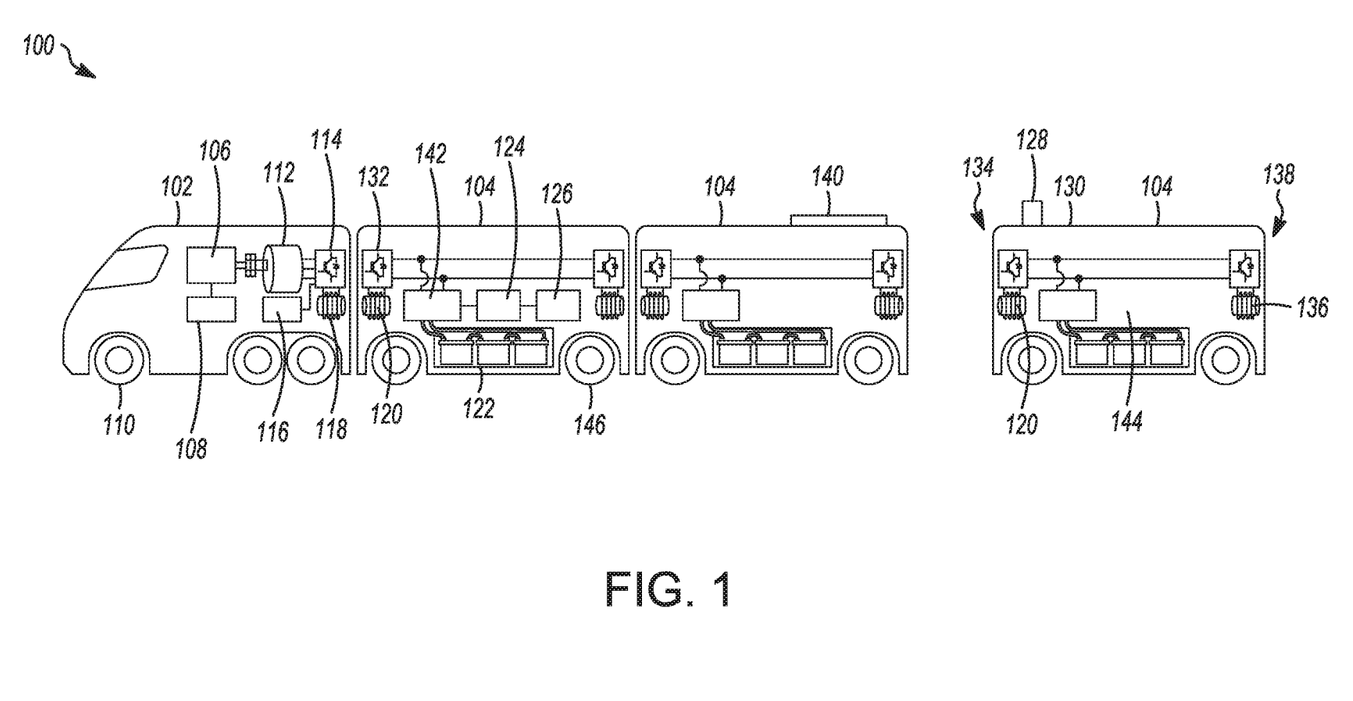
FIG. 1 is a schematic diagram of an autonomous, caravanning vehicle system, in accordance with embodiments of the disclosure.

FIG. 1 illustrates an exemplary caravanning vehicle system 100. The caravanning vehicle system may also be referred to as an "articulated" vehicle system, as the vehicles of the system are configured to behave, at least during certain parts of a journey, as modules of an articulated truck, in which the connections between each module are non-mechanical. That is, the caravanning vehicle system 100 includes a lead vehicle (referred to interchangeably as a "tractor module") 102 and one or more trailing vehicles 104 (referred to interchangeably herein as "trailer modules"). It should be appreciated that, in an aspect, the caravanning vehicle system 100 may have one lead vehicle 102 and one trailing vehicle 104, any one or more of which may be configured to be autonomous. In other aspects, the caravanning vehicle system 100 may have one lead vehicle 102 and a plurality of trailing vehicles 104, such as, for example, from two trailing vehicles 104 to about 30 trailing vehicles 104, any one or more of which may be configured to be autonomous. In embodiments, the vehicle system 100 may include more than one lead vehicle 102. According to embodiments, one or more aspects of the vehicle system 100 may be configured to be autonomous. In embodiments, the one or more aspects of the vehicle system 100 may be configured to be piloted by a human driver, selectively autonomous (that is, capable of being driven by a human and/or driving autonomously), or autonomous.

In embodiments, the lead vehicle 102 includes driving components of the vehicle system 100. For example, the lead vehicle 102 may include a prime mover, e.g., an engine 106, a transmission, a fuel tank, and/or the like. The engine 106 may be an internal combustion (IC) engine, enabled to change its output by a throttle control, such as a gasoline engine, a diesel engine or an LPG engine. In embodiments, the engine 106 may be, or include, an electric engine, a hybrid engine, and/or the like. The lead vehicle 102 also may include an automated driving system 108, which allows the lead vehicle 102 to be operated autonomously. In other embodiments, the lead vehicle 102 may be configured to be piloted by a human operator and/or selectively configured to be piloted by a human operator or autonomously piloted. The lead vehicle 102 is supported by multiple sets of lead vehicle wheels 110. Though not illustrated, the lead vehicle 102 also may include a spacing device that is configured to engage a spacing device on an adjacent trailing vehicle. The spacing device can be, for example, a mechanical shock-absorbing buffer such as a conical shaped spring.

In embodiments, the lead vehicle 102 further includes an electric generator 112, an electric power converter 114, a battery 116 and an inductive power transfer system 118. The electric generator 112 may be mechanically coupled to the engine 106. In embodiments, for example, the electric generator 112 may be a three-phase generator. The electric power converter 114 is coupled to the electric generator 112. The battery 116 and the inductive power transfer system 118 are connected to the electric power converter 114. In embodiments, the electric power converter 114 is configured to convert the electric power generated by the electric generator 112 to power that can be stored by the battery 116. The battery can take the form of any number of various primary or secondary batteries such as a lithium ion battery, a nickel metal hydride battery, a lead acid battery, an ultracapacitor, and/or the like.

The inductive power transfer system 118 in the lead vehicle 102 provides for wireless power transfer to and/or from an inductive power transfer system 120 in the trailing vehicle 104. In inductive power transfer, a primary (or "transmitter") power device transmits power to a secondary (or "receiver") power receiver device. Each of the transmitter and receiver power devices include inductors, typically an arrangement of coils or windings of electric current conveying media. An alternating current in the primary inductor produces a fluctuating electromagnetic field. When the secondary inductor is placed in proximity to the primary inductor, the fluctuating electromagnetic field induces an electromotive force (EMF) in the secondary inductor, thereby transferring power to the secondary power receiver device.

It should be appreciated that, in an aspect, the inductive power transfer system is able to function in a mode in which power is transferred the other way, i.e., both from the transmitted device to the receiver device and from the receiver device to the transmitter device. In the other mode, the receiver device functions as the "primary" device and the transmitter device functions as the "secondary" device. This allows, for example, power stored in a battery bank 122 in a trailing vehicle 104 to be transferred to a battery bank 122 in another trailing vehicle 104 or to a battery 116 in the lead vehicle 102. According to embodiments, the lead vehicle 102 may include a power transfer system of any number of other types in addition to, or in lieu of, an inductive power transfer system. That is, for example, an RF power transfer system may be used, an acoustic power transfer system may be used, and/or the like.

In embodiments, any one or more of the trailing vehicles 104 may include driving components of the vehicle system 100. For example, a trailing vehicle 104 may include an electric motor 124 and a transmission (not shown). For example, the trailing vehicle 104 may include an electric motor axle assembly. The electric axle can be on the rear axle, on the front axle, or on both the rear axle and the front axle. Each trailing vehicle 104 also may include an automated driving system 126, which allows the trailing vehicle 104 to be operated autonomously.

In embodiments, the trailing vehicle 104 is detachably connected at one or both ends to an end of the lead vehicle 102. The connection may be a mechanical connection (e.g., via a coupling such as a hitch) or a non-mechanical connection (e.g., via an automated drive system configured to cause the trailing vehicle 104 to follow the lead vehicle 102 and stay behind the lead vehicle 102, such as, for example, within a predetermined distance). In addition, the trailing vehicle 104 may be detachably connected at one or both ends to another trailing vehicle. Similarly, the connection between two trailing vehicles may be a mechanical connection or a non-mechanical connection. In this manner, two or more trailing vehicles 104 may be configured to travel in autonomous caravans having any number of trailing vehicles 104. The order of connection of two or more trailing vehicles 104 may also be specified.

Each trailing vehicle 104 may also be connected (e.g., via a wireless communication connection) to a data bus of the lead vehicle 102 such that the automated driving system 126 of the trailing vehicle 104 and/or sensors associated with the trailing vehicle 104 may provide data to and/or receive data from the automated driving system 108 in the lead vehicle 102 and/or the automated driving system(s) 126 of one or more other trailing vehicles 104. In embodiments, the trailing vehicle 104 also may include a vehicle homing device 128 mounted on its roof 130. When activated, the vehicle homing device 128 may be configured to emit a homing signal that is used to locate an appropriate lead vehicle 102 or trailing vehicle 104 for connection thereto and/or an appropriate truck terminal dock such as, for example, a dock at which a cargo being carried by the trailing vehicle 104 is to be delivered.

As shown, the trailing vehicle 104 may further include an electric power converter 132, a battery bank 122, a first inductive power transfer system 120 near a first end 134 of the trailing vehicle 104, and a second inductive power transfer system 136 near a second end 138 of the trailing vehicle 104. The electric power converter 132 is configured to convert generated electric power to energy storable by the battery bank 122. The trailing vehicle 104 may be electric and run solely on an electric battery bank 122. The batteries in the battery bank 122 can take the form of any number of various primary or secondary battery arrays such as a lithium ion battery array, a nickel metal hydride battery array, a lead acid battery array, an ultracapacitor array, and/or the like. In embodiments, the trailing vehicle 104 may be equipped with roof-mounted solar panels 140. The battery bank 122 may be configured to store energy from the solar panels 140.

As shown, the trailing vehicle 104 further includes a power management unit 142. The power management unit 142 is coupled to the electric power converter 132 and to the battery bank 122 and functions to ensure that sufficient power exists to provide for various running conditions of the trailing vehicle 104. The inductive power transfer system 120 and/or 136 in trailing vehicle 104 provides for wireless power transfer to and/or from the inductive power transfer system 116 in the lead vehicle 102 and/or to and/or from an inductive power system in another trailing vehicle 104.

In embodiments, the trailing vehicle 104 generally includes a large cargo area 144 for storing cargo, supported by multiple sets of trailing vehicle wheels 146. As illustrated, the trailing vehicle 104 may include two sets of trailing vehicle wheels 146, located at opposite ends 134, 138 of the trailing vehicle 104. In some embodiments, trailing vehicles 104 may include one or more additional sets of wheels 146. In other embodiments, the trailing vehicle 104 may include one or less sets of wheels 146. The cargo area 144 of each trailing vehicle 104 may include a flat bed, container, refrigerated container, and/or the like. Though not illustrated, the trailing vehicle 104 also may include a spacing device on opposite ends that is configured to engage a spacing device on an adjacent lead vehicle 102 and/or trailing vehicle 104. The spacing device can be a mechanical shock-absorbing buffer such as a conical shaped spring to eliminate damage to the vehicle modules that may result from bouncing, swaying, vibration of the vehicle modules on the road, and/or the like. In embodiments, the trailing vehicle 104 utilizes a regenerative braking system.

The illustrative caravanning vehicle system 100 shown in FIG. 1 is not intended to suggest any limitation as to the scope of use or functionality of embodiments of the present disclosure. The illustrative system 100 also should not be interpreted as having any dependency or requirement related to any single component or combination of components illustrated therein. Additionally, various components depicted in FIG. 1 may be, in embodiments, integrated with various ones of the other components depicted therein (and/or components not illustrated), all of which are considered to be within the ambit of the present disclosure.

Figure 2:
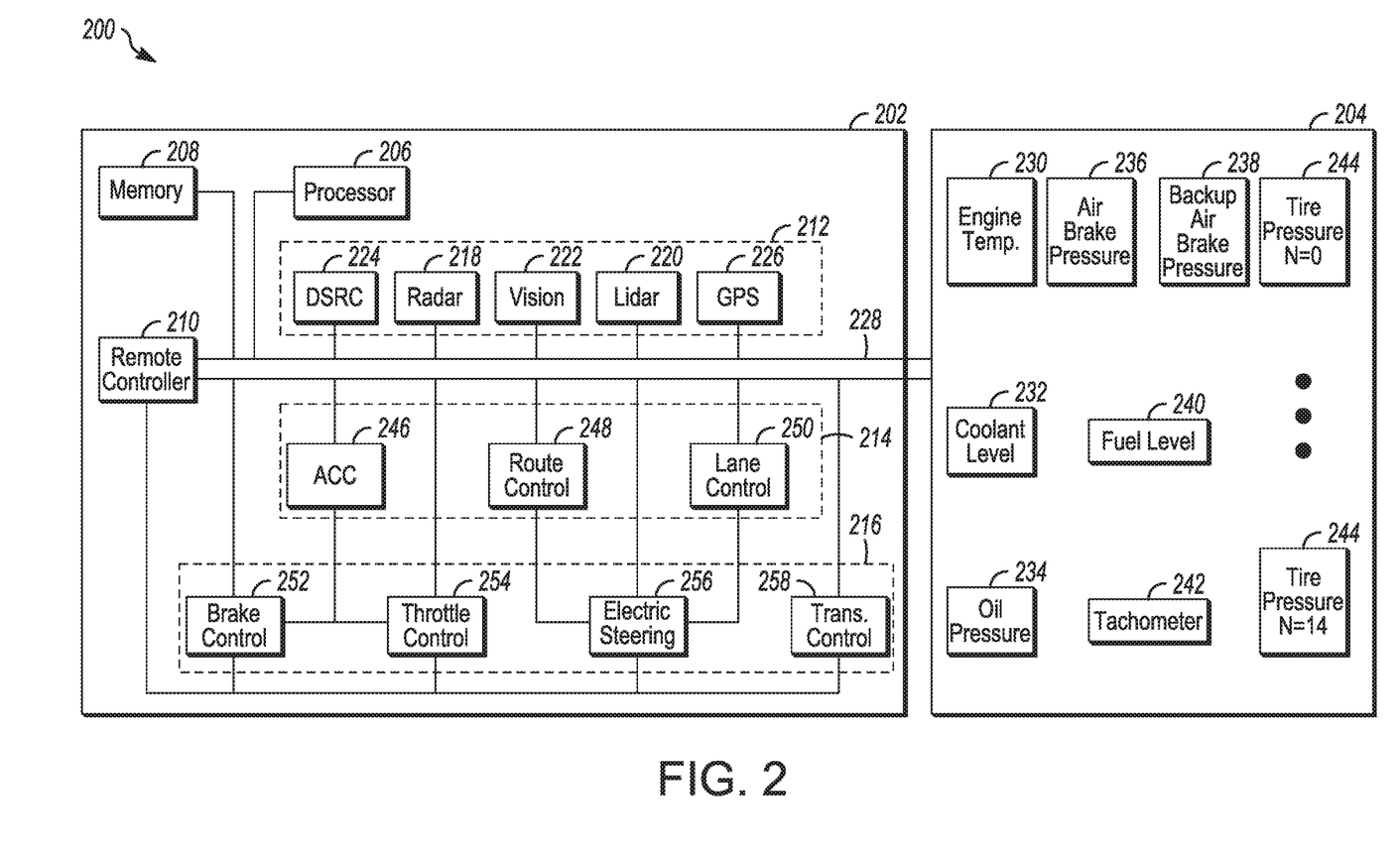
FIG. 2 is a block diagram of an illustrative operating environment, in accordance with embodiments of the disclosure.

As indicated above, the lead vehicle 102 and/or any number of trailing vehicles 104 may include automated driving systems that function as part of an operating environment to facilitate autonomous operation of one or more lead vehicles and/or trailing vehicles. FIG. 2 is a block diagram depicting an illustrative operating environment 200, in accordance with embodiments of the subject matter disclosed herein. As shown in FIG. 2, the operating environment 200 includes an automated driving system 202 and a set 204 of vehicle sensors. According to embodiments, the automated driving system 202 may be, be similar to, include, or be included in, the automated driving system 108 and/or the automated driving system 126 depicted in FIG. 1.

As shown in FIG. 2, the automated driving system 202 includes a plurality of sensors and controllers under the control of one or more processors 206 via instructions and/or corresponding data stored in a memory 208. In embodiments, a remote controller 210 may be implemented by the processor 206 and memory 208 and may control any number of other components of the automated driving system 202. The automated driving system 202 generally replaces the driver of the lead vehicle and a "driver" of the trailing vehicle, but may also allow manual override and control of the lead vehicle and/or trailing vehicle. As used herein, the term "driverless" refers to a state in which the automated driving system 202 controls the autonomous vehicle without input from a human driver.

According to embodiments, the automated driving system 202 may be conceptually divided into input systems 212, decision systems 214, and control systems 216. The input systems 212 determine information about the environment around the vehicle. The decision systems 214 generally determine how the autonomous vehicle should respond to the information obtained by the input systems 212, and the control systems 216 translate decisions of the decisions systems 214 and/or control systems 216 into controls of the autonomous vehicle.

The input systems 212 can include, but are not limited to, a radar system 218, a lidar system 220, a vision system 222, a dedicated Short Range Communication System (DSRC) 224, a global positioning system (GPS) 226, as well as, for example, any one or more sensors of the set 204 of vehicle sensors. The radar system 218 is used to detect and measure objects in the forward path of the vehicle module. Radar systems use microwave energy at various frequencies (e.g. 24.5 and 77 GHz are common). Radar systems are capable of accurately measuring distance and closing velocity. The radar system 218 may have the capability of tracking multiple targets simultaneously. The radar system 218 may be coupled with the vision system 222. The combined system may combine the radar data and vision data to provide a complete picture (landscape) of what is in front of the vehicle module.

The lidar system 220 is an imaging or measuring system that functions approximately the same as radar, but uses a laser as the active element. These systems are typically used in specialty markets (e.g. law enforcement and aircraft altimeters) for determining distance or speed. Lidar is also used extensively in research and development. In a commercial vehicle, the lidar system 220 may be used as a supplement or alternative to the radar system 218. The Lidar system 220 may provide more accurate measurements of distance and may provide better detection of stationary objects.

The vision system 222 provides forward, side and/or rear detection systems that use image processing algorithms to detect, classify, and measure various shapes and forms in images obtained from various cameras. The cameras may face in different directions. In an aspect, the cameras are paired to provide different points of view in the same direction. The vision system 222 is also used to read speed limit signs, warning signs, and other text based signage using optical character recognition.

The Dedicated Short Range Communication System (DSRC) 224 is a special spectrum of the 5.9 GHz band that was set aside by the FCC specifically for vehicular use. In addition, V2X communication is a protocol for communication that may be implemented between autonomous driving vehicles (V2V) or communication between an autonomous driving vehicle module and an infrastructure (V2I). This system provides for the passage of any information needed from one driverless vehicle module to another. It may be used, in combination with the GPS information from each module, to "map" the modules in the adjacent vicinities. In addition, it may be used to provide information from the infrastructure to the module such as warnings, notices, and navigation information. Stop signs, red lights, green lights, curves, work zones and the like may all be transmitted electronically to adjacent vehicle modules. In other embodiments, data is transferred magnetic inductively.

Wireless Communication between the automated driving system of a lead vehicle and a remote base station and/or between the automated driving system of a trailing vehicle and a remote base station may be provided by a variety of systems including, but not limited to, WiFi, cellular network, satellite, Bluetooth, infrared, ultrasound, short wave, microwave or any other suitable method. In embodiments, a secure remote connection may be established from a remote base station (e.g., a central monitoring and logistic office) to each vehicle on the system that allows pick-up, destination and route changes to be made in real-time based on needs and conditions. In embodiments, hardwired communication may be effected at close range such as when the vehicle is within a service yard or at a base station wherein an ethernet connection may suffice.

In embodiments, a dual communication system is utilized via inductive power transfer and a wireless transmitter. The power electronics converter feeding the inductive power transfer system may be programmed to generate pulse width modulation (PWM) signals that contain both the information of the (1) voltage that defines power, and (2) communication signals. The communication signal can be superimposed over the PWM voltage signals with higher frequency. The communication signal may contain the following information: (1) command to start/stop charging the battery of each trailing vehicle, (2) identification of each trailing vehicle, (3) current status of each vehicle in terms of weight, battery energy levels, delivery schedule, etc. Such information may be transmitted wirelessly between lead vehicles and trailing vehicles to be compared to the PWM data together with a checksum algorithm for an added level of safety.

The Global Positioning System (GPS) 226 uses a series of satellites that broadcast continuous time information. Using an algorithm that converts the time of arrival from several satellites to positional information, a receiver may determine the location anywhere on the globe.

Additional inputs may be provided by the set 204 of vehicle module sensors, which may include any sensors associated with the operation of autonomous vehicle modules, including sensors for the lead vehicle and/or sensors for one or more trailing vehicles. The set 204 of vehicle module sensors may include sensors available on conventional vehicles. In a conventional vehicle, the sensor information is often provided via a data bus 228 (e.g., a J1939 bus) to a dashboard display. In the autonomous commercial vehicle operating at in the driverless state, the sensor information may be provided to automated driving system 202 on the vehicle modules. The automated driving system 202 may detect vehicle module component failures based on one or more of the set 204 of vehicle sensors. The automated driving system 202 may monitor the current value of each of the vehicle sensors and also track the values over time to determine instantaneous and longer rates of change.

The vehicle sensors may include, but are not limited to, an engine temperature sensor 230, a coolant level sensor 232, an oil pressure sensor 234, an air brake pressure sensor 236, a backup air brake pressure sensor 238, a fuel level sensor 240, a tachometer 242, and a tire pressure sensor 244 corresponding to each tire. It should be appreciated that the inventive vehicle system may include any number of tires (N). For example, many commercial vehicles include eighteen (18) tires or more and may include a corresponding number of tire pressure sensors 244.

The decision systems 214 include an adaptive cruise control (ACC) system 246, a route control system 248, and a lane control system 250. The Adaptive Cruise Control (ACC) 246 uses one of the forward looking sensors (e.g., radar system 218, but could use vision system 222 or lidar system 220) to gauge the distance to the vehicle in front of the autonomous vehicle system and maintain a constant distance. The Lane Departure Warning or the lane control system 250 uses a vision system to "see" (e.g., to identify within a graphics image) the strips or other markings on the road and to notify a remote monitor or fleet manager when the vehicle is crossing over the lane. The system is also used in some embodiments as a lane keeping device to assist in keeping the system and/or vehicle modules in the designated lane.

The control systems 216 include a brake control system 252, a throttle control system 254, an electronic steering system 256, and a transmission control system 258. The various components of the automated driving system 202 may be coupled to one another via a data bus 228. The brake control system 252 is used to automatically adapt to road and terrain conditions and to automatically stop or to slow down the lead vehicle and trailing vehicle of the autonomous, caravanning vehicle system should a wheel sensor or one of the forward looking sensors (radar system 218, vision system 222, lidar system 220) detect an aberrant road or terrain feature or an object in the path of the autonomous, caravanning, vehicle system and/or individual vehicle modules. The term electronic suspension and braking or electric suspension and brake control refers to the fact that the suspension and brakes are controlled via an intelligent electronic system.

The throttle control system 254 is a direct control of the engine speed both for internal combustion engines and electric motors. In a conventional vehicle, the throttle may be electronically controlled though a pulse width modulated signal from the throttle pedal. In the autonomous vehicle modules of system, the throttle signal may be directly controlled by the automated driving system 202 based on decision systems 214 such as ACC system 246. The throttle control signals may be specific to an original equipment manufacturer (OEM) of the engine and throttle control system 254 may be configured to provide the appropriate throttle signal.

The electric steering system 256 or active all-wheel steering enables the steering mechanism of the vehicle modules of the autonomous vehicle system to be controlled through electronic means and for the lead vehicle and trailing vehicles to be steered left or right via wheels in the front and rear both turning, thereby reducing steering radius, reducing lane change time and increasing vehicle stability and turn smoothness. Most electronic steering applications simply add a stepper motor to the existing steering control gear box. In a fully driverless vehicle, the stepper motor may completely replace the steering control arm and gearbox. The electronic steering system 256 may be manually controlled via wired or wireless access to the automated driving system 202. In another aspect, the electronic steering 256 may be implemented using hydraulic control via a power steering system. An electronically controlled proportioning valve may be added to the power steering system. The electronic steering system 256 may control, via the proportioning valve, the proportion of power steering fluid applied in each steering direction thereby steering the vehicle.

As indicated above, the automated driving system 202 may also include a remote controller 210 for heightened safety and versatility. The remote controller 210 may be implemented by the processor 206 and the memory 208 or may include a separate processor and memory storing executable instructions for detecting and responding to emergency situations. The remote controller 210 may be coupled to the data bus 228 and receive any signals generated by the vehicle sensors via the data bus 228. In another aspect, one or more of the vehicle sensors may be connected to the remote controller 210. For example, the remote controller 210 may include input ports for receiving a connection to one or more of the vehicle sensors. The remote controller 210 may also receive input from the input sources. In an aspect, the remote controller 210 may bypass decision systems 214 such as the ACC system 246, route control system 248, and lane control system 250 and directly control the control systems to control the autonomous vehicle system. In an aspect, the remote controller 210 may detect a component failure, classify the severity of the component failure, and perform an emergency stop when the component failure is a critical component failure. After an emergency stop, the remote controller 210 may provide information to a fleet manager regarding the status of the autonomous vehicle system and the affected vehicle module and the reasons for the emergency stop. The remote controller 210 may further perform an evaluation of the autonomous vehicle module to determine whether the affected vehicle module can be moved. In an aspect, the remote controller 210 may operate the autonomous commercial vehicle in a creep mode with one or more component failures. The creep mode may allow for a remote operator (e.g., a fleet manager) to assume manual remote control of the affected vehicle module.

In embodiments, any number of the various systems and/or sensors discussed above may be used to facilitate implementing an algorithm that is configured to monitor the state of electrical charge of each trailing vehicle to ensure balance and adequate recharging for each trailing vehicle. In embodiments, the algorithm may be implemented at a central station, in one or more processors of a lead vehicle, across multiple processors of multiple vehicles, and/or the like. The algorithm may be further configured to ensure that the charging system (e.g., the power transfer systems) maintains a specified level of charging efficiency by compensating for alignment between transmitters and receivers disposed in adjacent vehicles. That is, for example, since the system may be configured to dynamically transfer power from one vehicle to another while the vehicles are traveling in a caravan, the algorithm may be configured to utilize sensors on adjacent vehicles to cause the vehicles to maintain a certain degree of alignment so as to facilitate alignment of transmitters and receivers of the power transfer systems and/or to increase or decrease power transmission levels in response to detecting alignment changes, thereby maintaining a specified level of charging efficiency.

According to various embodiments of the disclosed subject matter, any number of the components depicted in FIG. 2 may be implemented on one or more computing devices. A computing device may include any type of computing device suitable for implementing aspects of embodiments of the disclosed subject matter. Examples of computing devices include specialized computing devices or general-purpose computing devices such "workstations," "servers," "laptops," "desktops," "tablet computers," "hand-held devices,"

"general-purpose graphics processing units (GPGPUs)," and the like, all of which are contemplated within the scope of FIG. 2, with reference to various components of the operating environment 200.

In embodiments, as is also illustrated in FIG. 2, a computing device includes a bus 228 that, directly and/or indirectly, couples devices such as a processor 206, a memory 208, an input/output (I/O) port (not shown), an I/O component (e.g., the remote controller 210), and a power supply (not shown). Any number of additional components, different components, and/or combinations of components may also be included in the computing device. The I/O component may include a presentation component configured to present information to a user such as, for example, a display device, a speaker, a printing device, and/or the like, and/or an input device such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus 228 represents what may be one or more busses (such as, for example, an address bus, data bus, or combination thereof), and may, in embodiments, be, include, or be included in, a controller area network (CAN). Similarly, in embodiments, the computing device may include a number of processors, a number of memory components, a number of I/O ports, a number of I/O components, and/or a number of power supplies. Additionally any number of these components, or combinations thereof, may be distributed and/or duplicated across a number of computing devices.

In embodiments, the memory 208 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. In embodiments, the memory 208 stores computer-executable instructions for causing the processor 206 to implement aspects of embodiments of system components discussed herein and/or to perform aspects of embodiments of methods and procedures discussed herein.

The computer-executable instructions may include, for example, computer code, machine-useable instructions, and the like such as, for example, program components capable of being executed by one or more processors 206 associated with the computing device. Program components may be programmed using any number of different programming environments, including various languages, development kits, frameworks, and/or the like. Some or all of the functionality contemplated herein may also, or alternatively, be implemented in hardware and/or firmware.

The illustrative operating environment 200 shown in FIG. 2 is not intended to suggest any limitation as to the scope of use or functionality of embodiments of the present disclosure. The illustrative operating environment 200 also should not be interpreted as having any dependency or requirement related to any single component or combination of components illustrated therein. Additionally, various components depicted in FIG. 2 may be, in embodiments, integrated with various ones of the other components depicted therein (and/or components not illustrated), all of which are considered to be within the ambit of the present disclosure.

Figure 3:
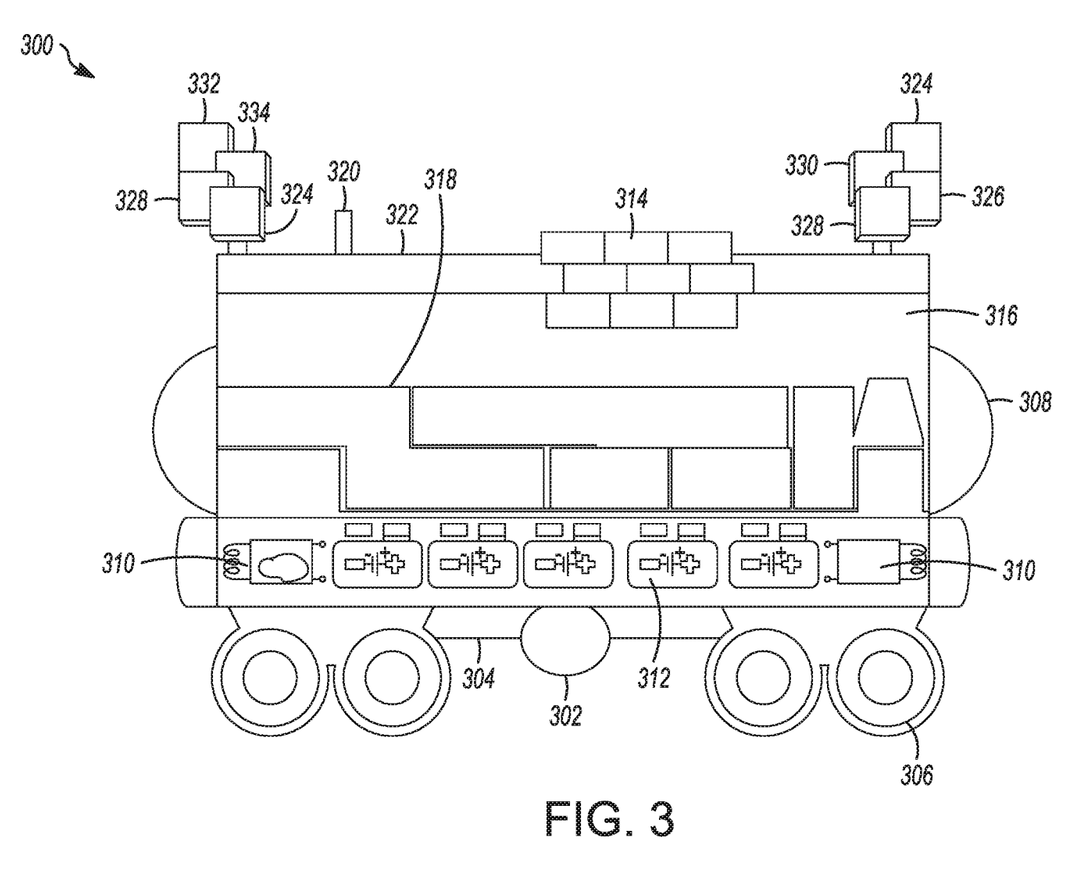
FIG. 3 is a schematic diagram of a trailing vehicle, in accordance with embodiments of the disclosure.

FIG. 3 illustrates a trailing vehicle 300 of an autonomous, caravanning vehicle system (e.g., the vehicle system 100 depicted in FIG. 1). The trailing vehicle 300 includes driving components of the vehicle system. For example, the trailing vehicle 300 includes an electric motor 302 and a transmission 304 such as, for example, an electric motor axle assembly 304. The trailing vehicle 300 is supported by multiple sets of trailing vehicle wheels 306. As illustrated, the trailing vehicle 300 includes four sets of trailing vehicle wheels 306, two sets located at opposite ends of the trailing vehicle 300. In some embodiments, trailing vehicles may include one or more additional sets of wheels. In other embodiments, the trailing vehicle 300 may include one or less sets of wheels. The trailing vehicle 300 also may include a spacing device 308 that is configured to engage a spacing device on an adjacent trailing vehicle or a lead vehicle if the two vehicles get too close to one another. The spacing device 308 can be a mechanical shock-absorbing buffer such as a conical shaped spring. The spacing device 308 can be a mechanical shock-absorbing buffer such as a conical shaped spring to eliminate damage to the vehicle modules that may result from bouncing, swaying, and vibration of the vehicle modules on the road. In embodiments, the trailing vehicle utilizes a regenerative braking system.

The power transfer systems 310 provide for wireless power transfer to and from the inductive power transfer systems in other trailing vehicles and/or in a lead vehicle. The trailing vehicle 300 also includes an automated driving system (not shown), which allows the trailing vehicle 300 to be operated autonomously. As shown, the trailing vehicle 300 includes a power transfer system 310 (e.g., an inductive power transfer system) at each end of the vehicle 300. The trailing vehicle 300 further includes a battery bank 312. The batteries in the battery bank 312 can take the form of any number of various primary or secondary battery arrays such as a lithium ion battery array, a nickel metal hydride battery array, a lead acid battery array, an ultracapacitor array, and/or the like. The trailing vehicle 300 may be equipped with roof mounted solar panels 314. The battery bank 312 may be configured to store energy from the solar panels 314, the power transfer system 310, and/or the like.

The trailing vehicle 300 generally includes a large cargo area 316 for storing cargo 318. The cargo area 316 of each trailing vehicle 300 may include a flat bed, container, refrigerated container, and/or the like. As shown, the trailing vehicle 300 may include a vehicle homing device 320 mounted on its roof 322. When activated, the vehicle homing device 320 emits a homing signal that is used to home in on or to locate, an appropriate truck terminal dock, other trailing vehicle, lead vehicle, and/or the like. The trailing vehicle 300 also may include input systems such as, for example, a radar system 324, a LIDAR system 326, a vision system 328, a Dedicated Short Range Communication System (DSRC) 330, a global positioning system (GPS) 332, a set 334 of vehicle sensors, and/or the like.

Figure 4:
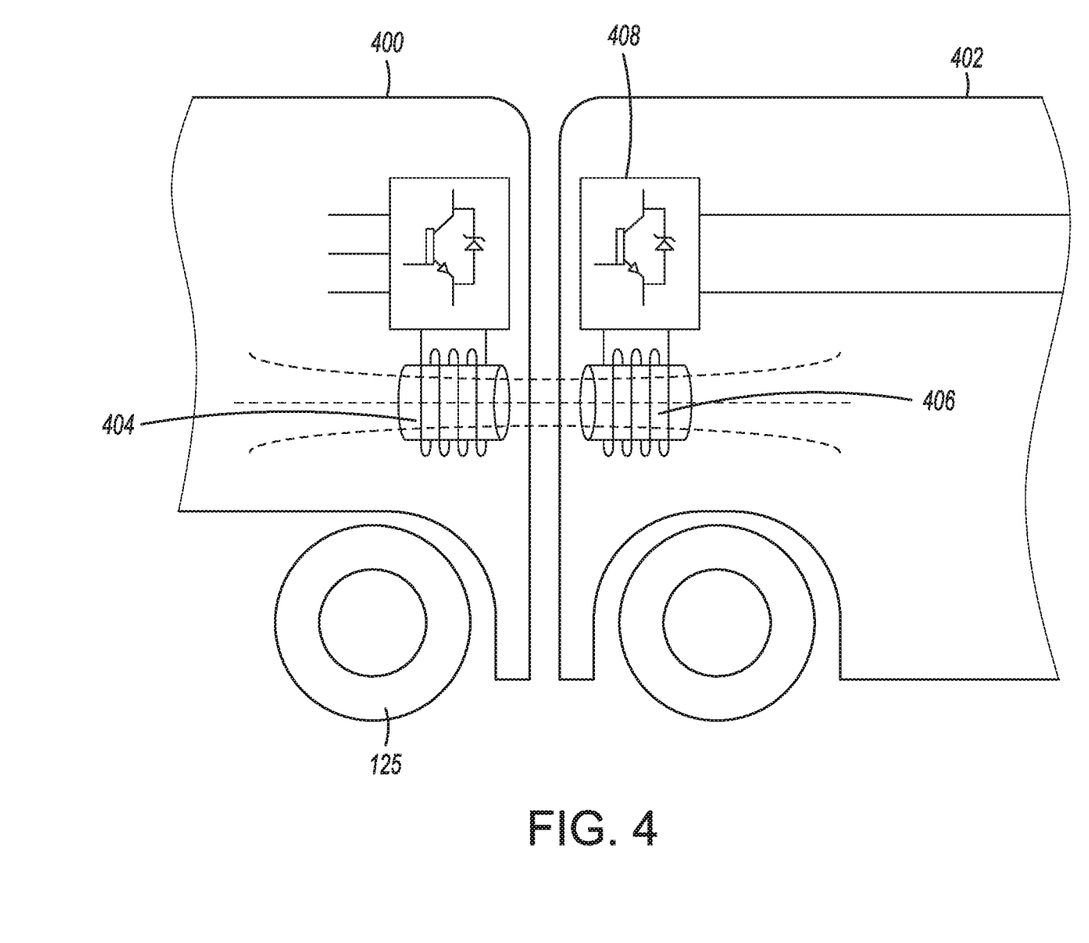
FIG. 4 is a schematic diagram of adjacent trailing vehicles configures to transfer power through an inductive power transfer system, in accordance with embodiments of the disclosure.

FIG. 4 illustrates two adjacent trailing vehicles 400 and 402 of an autonomous, caravanning vehicle system (e.g., the vehicle system 100 depicted in FIG. 1). An inductive power transfer system 404 in the first trailing vehicle 400 provides for wireless power transfer to and from the inductive power transfer system 406 in the second trailing vehicle 402. An electric power converter 408 is coupled to the inductive power transfer system 406 and configured to convert the received power into electrical energy that is storable in a battery and/or useable by an electric motor.

The illustrative trailing vehicles 300, 400, and 402 shown in FIGS. 3 and 4 are not intended to suggest any limitation as to the scope of use or functionality of embodiments of the present disclosure. The illustrative trailing vehicles 300, 400, and 402 also should not be interpreted as having any dependency or requirement related to any single component or combination of components illustrated therein. Additionally, various components depicted in FIGS. 3 and 4 may be, in embodiments, integrated with various ones of the other components depicted therein (and/or components not illustrated), all of which are considered to be within the ambit of the present disclosure.

Figure 5A:
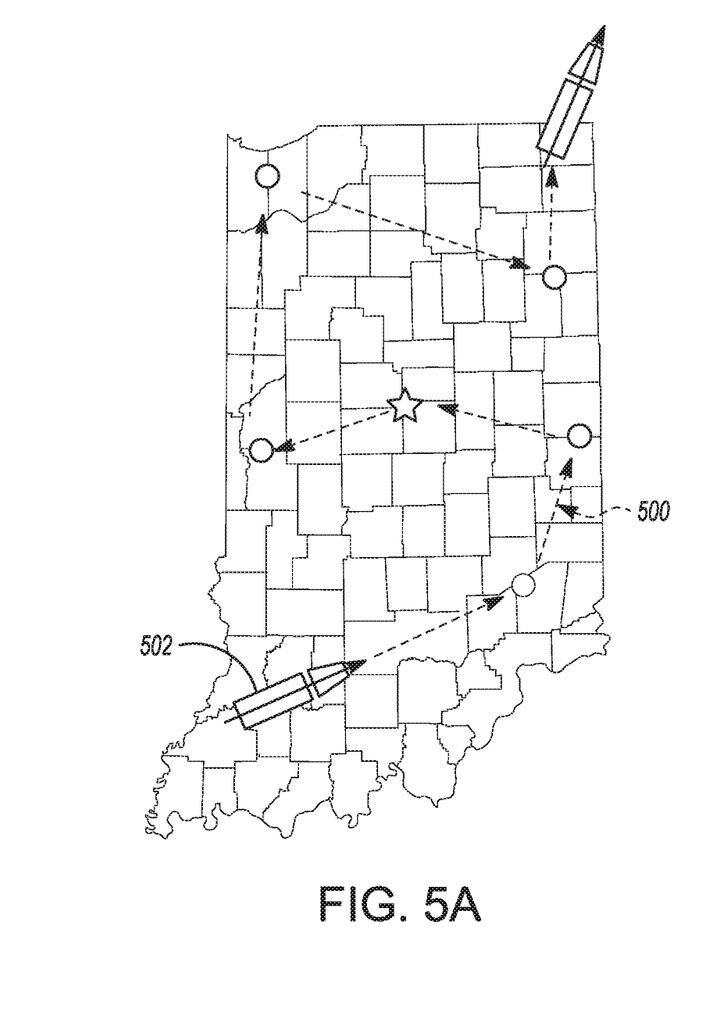
FIGS. 5A and 5B are schematic representations of illustrative commercial routes illustrating the routing advantages of embodiments of the disclosure.
Figure 5B:
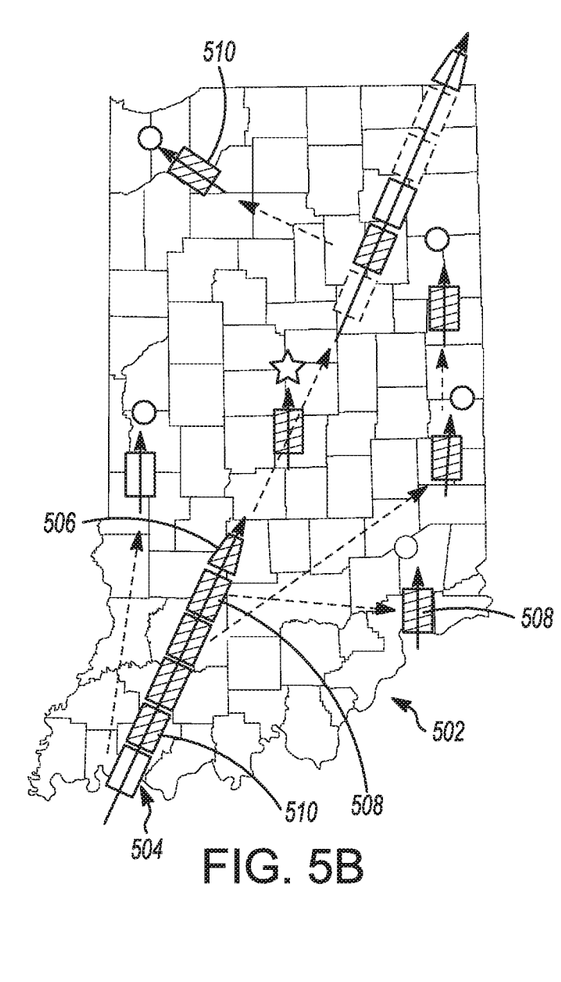

FIGS. 5A and 5B illustrate route management advantages of autonomous, caravanning vehicle systems (e.g., the vehicle system 100 depicted in FIG. 1), in accordance with embodiments of the subject matter disclosed herein. FIG. 5A depicts an exemplary route 500 that a conventional tractor trailer 502 must travel, including stops at each destination on the route 500. Autonomous, caravanning vehicle system 504 includes a lead vehicle 506 and a number of trailing vehicles 508, 510. The trailing vehicles 508 and 510 are programmed to disengage from the lead vehicle 506 of the vehicle system 504 and operate autonomously to deliver cargo. The autonomous, caravanning vehicle system 504 provides a novel solution to shortest path problems hitherto not possible.

In this manner, embodiments of the caravanning vehicle system described herein may be operated according to a method of operation that includes, for example, non-mechanically connecting a first trailing vehicle to a lead vehicle, the lead vehicle having an engine; non-mechanically connecting a second trailing vehicle to the first trailing vehicle; programming the first trailing vehicle to travel to a first destination along a first route; and programming the second trailing vehicle to travel to a second destination along a second route, wherein the first and second routes include a shared route portion during which the first and second trailing vehicles are programmed to caravan with the lead vehicle.

The illustrative routes 500 and 502 shown in FIGS. 5A and 5B are not intended to suggest any limitation as to the scope of use or functionality of embodiments of the present disclosure. The illustrative routes 500 and 502 also should not be interpreted as having any dependency or requirement related to any single aspect or combination of aspects illustrated therein. Additionally, various aspects depicted in FIGS. 5A and 5B may be, in embodiments, integrated with various ones of the other components depicted therein (and/or components not illustrated), all of which are considered to be within the ambit of the present disclosure.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A caravanning vehicle system, comprising:
   a lead vehicle comprising:
      an engine,
      an electric generator that is driven by the engine to generate electric power,
      a power transfer system,
      an electric power converter coupled with the electric generator and feeding the power transfer system;
   at least one trailing vehicle comprising an electric motor, wherein the at least one trailing vehicle is non-mechanically connected to the lead vehicle,
   wherein the power transfer system is configured to transfer the electric power generated by the electric generator to the at least one trailing vehicle,
   wherein the electric power converter is configured to generate one or more pulse width modulation (PWM) signals for wireless transmission between the lead vehicle and the at least one trailing vehicle, the one or more PWM signals comprising voltage information and communication signals, wherein the communication signals comprise a current vehicle status, the current vehicle status indicating a vehicle weight and a delivery schedule.

2. The caravanning vehicle system of claim 1, wherein at least one of the lead vehicle and the at least one trailing vehicle is autonomous.

3. The caravanning vehicle system of claim 2, wherein the at least one trailing vehicle is autonomous, and wherein the at least one trailing vehicle is configured to non-mechanically connect to the lead vehicle by autonomously following the lead vehicle and staying within a predefined distance of the lead vehicle.

4. The caravanning vehicle system of claim 1, wherein the engine comprises at least one of an internal combustion engine and a hydrogen fuel cell engine.

5. The caravanning vehicle system of claim 1, wherein the power transfer system comprises an inductive power transfer system.

6. The caravanning vehicle system of claim 1, wherein the at least one trailing vehicle comprises a first trailing vehicle and a second trailing vehicle.

7. The caravanning vehicle system of claim 6, wherein the first trailing vehicle is programmed to travel to a first destination along a first route and the second trailing vehicle is programmed to travel to a second destination along a second route, wherein the first and second routes include a shared route portion.

8. The caravanning vehicle system of claim 7, wherein the first and second trailing vehicles are programmed to caravan with the lead vehicle during the shared route portion.

9. A method of operating a caravanning vehicle system, comprising:
   non-mechanically connecting a first trailing vehicle to a lead vehicle, the lead vehicle having an engine;
   non-mechanically connecting a second trailing vehicle to the first trailing vehicle;
   programming the first trailing vehicle to travel to a first destination along a first route;
   programming the second trailing vehicle to travel to a second destination along a second route, wherein the first and second routes include a shared route portion during which the first and second trailing vehicles are programmed to caravan with the lead vehicle; and
   generating one or more pulse width modulation (PWM) signals for wireless transmission between each of the lead vehicle, the first trailing vehicle, and the second trailing vehicle, the one or more PWM signals comprising voltage information and communication signals, wherein the communication signals comprise a current vehicle status, the current vehicle status indicating a vehicle weight and a delivery schedule.

10. The method of claim 9, wherein the first and second trailing vehicles are autonomous.

11. The method of claim 9, wherein the lead vehicle comprises an electric generator that is driven by the engine to generate electric power.

12. The method of claim 11, wherein the lead vehicle further comprises a power transfer system configured to transfer the electric power generated by the electric generator to the at least one trailing vehicle.

13. The method of claim 12, wherein the power transfer system comprises an inductive power transfer system.

14. A non-transitory computer-readable storage medium comprising instructions, which, when executed on a processor, causes a caravanning vehicle system having a lead vehicle having an engine and at least a first trailing vehicle non-mechanically connected to the lead vehicle to:
   non-mechanically connect a second trailing vehicle to the first trailing vehicle; and
   generate one or more pulse width modulation (PWM) signals comprising voltage information and communication signals, wherein the communication signals comprise a current vehicle status, the current vehicle status indicating a vehicle weight and a delivery schedule.

15. The non-transitory computer-readable storage medium of claim 14, wherein the instructions further cause the caravanning vehicle system to program the first trailing vehicle to travel to a first destination along a first route.

16. The non-transitory computer-readable storage medium of claim 15, wherein the instructions further cause the caravanning vehicle system to program the second trailing vehicle to travel to a second destination along a second route.

17. The non-transitory computer-readable storage medium of claim 16, wherein the first and second routes include a shared route portion during which the first and second trailing vehicles are programmed to caravan with the lead vehicle.

18. The non-transitory computer-readable storage medium of claim 17, wherein the first and second trailing vehicles are autonomous.

19. The caravanning vehicle system of claim 1, wherein the communication signals comprise at least one of a command to start or stop charging a battery of the at least one trailing vehicle or an identification of the at least one trailing vehicle.

20. The method of claim 9, wherein the communication signals comprise at least one of a command to start or stop charging a battery of the at least one trailing vehicle or an identification of the at least one trailing vehicle, or a current status of the lead vehicle and the at least one trailing vehicle.

* * * * *